(12) United States Patent
Sage

(10) Patent No.: US 7,359,447 B2
(45) Date of Patent: Apr. 15, 2008

(54) ASYNCHRONOUS DIGITAL SIGNAL COMBINER AND METHOD OF COMBINING ASYNCHRONOUS DIGITAL SIGNALS IN CABLE TELEVISION RETURN PATH

(75) Inventor: Gerald F. Sage, Chico, CA (US)

(73) Assignee: Finisar Corporation, Sunnyvale, CA (US)

( * ) Notice: Subject to any disclaimer, the term of this patent is extended or adjusted under 35 U.S.C. 154(b) by 978 days.

(21) Appl. No.: 10/357,918

(22) Filed: Feb. 3, 2003

(65) Prior Publication Data

US 2003/0156602 A1 Aug. 21, 2003

Related U.S. Application Data

(60) Provisional application No. 60/358,556, filed on Feb. 19, 2002.

(51) Int. Cl.
H04B 7/02 (2006.01)
H03H 7/30 (2006.01)

(52) U.S. Cl. ................. 375/267; 375/229; 375/347

(58) Field of Classification Search ........... 375/267, 375/347, 229–236, 143, 152, 240.29, 343, 375/350; 455/132, 137, 138, 139
See application file for complete search history.

(56) References Cited

U.S. PATENT DOCUMENTS

| | | |
|---|---|---|
| 5,014,309 A | 5/1991 | West, Jr. |
| 5,142,690 A | 8/1992 | McMullan, Jr. et al. |
| 5,155,590 A | 10/1992 | Beyers, II et al. ............ 358/86 |
| 5,208,854 A | 5/1993 | West, Jr. |
| 5,225,902 A | 7/1993 | McMullan, Jr. ............... 358/86 |
| 5,235,619 A | 8/1993 | Beyers, II et al. |
| 5,243,651 A | 9/1993 | Parikh et al. |
| 5,245,420 A | 9/1993 | Harney et al. |
| 5,247,364 A | 9/1993 | Banker et al. ............ 358/191.1 |
| 5,251,324 A | 10/1993 | McMullan, Jr. |
| 5,255,086 A | 10/1993 | McMullan, Jr. et al. |
| 5,301,028 A | 4/1994 | Banker et al. .............. 348/570 |
| 5,303,295 A | 4/1994 | West et al. |
| 5,317,391 A | 5/1994 | Banker et al. ................. 348/6 |
| 5,319,454 A | 6/1994 | Schutte |
| 5,323,462 A | 6/1994 | Farmer |
| 5,357,276 A | 10/1994 | Banker et al. ................. 348/7 |
| 5,430,568 A | 7/1995 | Little et al. ................. 359/124 |
| 5,442,472 A | 8/1995 | Skrobko ..................... 359/110 |
| 5,497,187 A | 3/1996 | Banker et al. ................. 348/6 |
| 5,499,241 A | 3/1996 | Thompson et al. ........... 370/73 |
| 5,505,901 A | 4/1996 | Harney et al. |

(Continued)

FOREIGN PATENT DOCUMENTS

WO WO 00/25459 5/2000

*Primary Examiner*—David C. Payne
*Assistant Examiner*—Linda Wong
(74) *Attorney, Agent, or Firm*—Workman Nydegger

(57) ABSTRACT

A device for and method of combining asynchronous digital return signals from multiple nodes of a CATV return path is disclosed. The signals are digitally filtered, re-sampled at a common output rate and digitally combined (e.g., summed) without being converted to analog form. The combined signal can be provided to an optical data transmitter for transmission over an optical fiber to the head end. Because the device of the present embodiment does not require analog hardware (e.g., converters, D/A converters and analog summers), it is smaller, costs less and consumes less power than conventional CATV return signal combiners.

16 Claims, 9 Drawing Sheets

U.S. PATENT DOCUMENTS

| | | | |
|---|---|---|---|
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,719,867 A | 2/1998 | Borazjani | 370/436 |
| 5,719,872 A | 2/1998 | Dubberly et al. | 370/487 |
| 5,794,117 A | 8/1998 | Benard | |
| 5,826,167 A | 10/1998 | Jelinek et al. | 455/5.1 |
| 5,854,703 A | 12/1998 | West, Jr. | 359/167 |
| 5,926,478 A | 7/1999 | Ghaibeh et al. | |
| 5,930,231 A | 7/1999 | Miller et al. | 370/210 |
| 5,963,153 A * | 10/1999 | Rosefield et al. | 341/61 |
| 5,963,352 A | 10/1999 | Atlas et al. | 359/161 |
| 6,161,011 A | 12/2000 | Loveless | 455/426 |
| 6,272,150 B1 | 8/2001 | Hrastar et al. | 370/486 |
| 6,356,369 B1 | 3/2002 | Farhan | 359/125 |
| 6,356,374 B1 | 3/2002 | Farhan | 359/180 |
| 6,373,611 B1 | 4/2002 | Farhan et al. | 359/180 |
| 6,417,949 B1 | 7/2002 | Farhan et al. | 359/173 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 | 10/2002 | West, Jr. | 359/173 |
| 6,519,067 B2 | 2/2003 | Farhan et al. | 359/180 |
| 6,523,177 B1 | 2/2003 | Brown | 725/121 |
| 2003/0058950 A1 * | 3/2003 | McCoy | 375/260 |

\* cited by examiner

ASYNCHRONOUS DIGITAL SIGNAL COMBINER AND METHOD OF COMBINING ASYNCHRONOUS DIGITAL SIGNALS IN CABLE TELEVISION RETURN PATH

The present application claims priority to, under 35 U.S.C. 119(e), U.S. Provisional Patent Application bearing Ser. No. 60/358,556, filed Feb. 19, 2002, which is incorporated herein by reference.

BRIEF DESCRIPTION OF THE INVENTION

The present invention pertains generally to cable television systems (CATV). More specifically, the present invention pertains to an asynchronous digital return combiner for a CATV return path.

BACKGROUND OF THE INVENTION

Cable television systems (CATV) were initially deployed so that remotely located communities were allowed to place a receiver on a hilltop and to use coaxial cable and amplifiers to distribute received signals down to the town that otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path." A good review of much of today's existing return path technology is contained in the book entitled *Return Systems for Hybrid Fiber Coax Cable TV Networks* by Donald Raskin and Dean Stoneback, hereby incorporated by reference as background information.

One innovation, which has become pervasive throughout the CATV industry over the past decade, is the introduction of fiber optics technology. Optical links have been used to break up the original tree and branch architecture of most CATV systems and to replace that with an architecture labeled Hybrid Fiber/Coax (HFC). In this approach, optical fibers connect the head end of the system to neighborhood nodes, and coaxial cables are used to connect the neighborhood nodes to homes, businesses and the like in a small geographical area.

FIG. 1 shows the architecture of a HFC cable television system. Television programming and data from external sources are sent to the customers over the "forward path." Television signals and data are sent from a head end 10 to multiple hubs 12 over optical links 11. At each hub 12, data is sent to multiple nodes 14 over optical links 13. At each node 14, the optical signals are converted to electrical signals and sent to customers over a coaxial cable 15 in the frequency range of 55 to 850 MHz.

Data or television programming from the customer to external destinations, also known as return signals or return data, are sent over the "return path." From the customer to the node, return signals are sent over the coaxial cable 15 in the frequency range of 5 to 42 MHz in the U.S. At the nodes 14, the return signals are converted to optical signals and sent to the hub 12. The hub combines signals from multiple nodes 14 and sends the combined signals to the head end 10.

FIG. 2 is a block diagram of the return path portions of a conventional HFC system. Analog return signals are routed over coaxial cables 15 to nodes 14 where the signals are converted by analog to digital (A/D) converters 142 to digital return signals. The digital return signals are transmitted over digital optical links to a hub 12. The sample rate of each digital return signal is determined independently. A typical sample rate is approximately 100 MHz, but it varies from node to node.

The hub 12 receives digital return signals from two or more (any typically many) nodes 14. In a typical system there are fewer fiber links to the head end than there are fiber links coming from the nodes. Accordingly, the signals from multiple nodes must be combined. But these digital return signals, which are asynchronous, cannot be summed directly. Thus, the digital return signals are converted to analog format by Digital Receivers with Analog Outputs 122. Then, the analog return signals are summed by an Analog Summer 124. The summed signal is converted back to a combined digital return signal by A/D converter 126 for transmission to the head end 10 via an optical link.

A more detailed block diagram of a conventional hub 12 is illustrated by FIG. 3. As shown, the hub 12 receives digital return signals from multiple nodes 14. Each of the digital return signals is converted into an analog signal by a respective digital-to-analog (D/A) converter 132. Because each digital return signal can have a different sample rate, the hub 12 includes a separate clock recovery circuit 130 for each input signal to generate a recovered clock signal that is used to drive the D/A converter 132. The output of the D/A converter 132 is filtered by an analog filter 134 to remove aliasing artifacts. The Analog Summer 124 then sums multiple signals. After summation the summed signal is converted back to digital signals by an A/D converter 126 for transport to the head end. The A/D converter 126 is driven by an output sample clock, operating at an output sample rate that is typically close to but not identical to the sample rates of the digital signals received from the nodes 14.

The conversion from digital signals to analog signals and back to digital signals is an indirect and contrived process. High-speed digital-to-analog converters and analog-to-digital converters are expensive and add significant cost bases to the HFC equipment. Furthermore, precision errors are inevitably introduced during the conversions.

Accordingly, what is needed is a device for and a method of combining multiple digital return signals in a CATV return path without requiring multiple analog/digital conversions.

SUMMARY OF THE INVENTION

In an asynchronous digital signal combiner, input samples from multiple nodes are interpolated digitally to a common sample rate that is defined by a single frequency source. The interpolated samples, which are synchronous, are digitally summed. Because the asynchronous digital summer of the present embodiment does not require A/D converters, D/A converters and analog summers, it is smaller, costs less and consumes less power than conventional signal combiners.

The asynchronous digital signal combiner includes a plurality of signal receivers for receiving digital data streams, a clock source, a set of asynchronous dual-rate filters and a digital summer. Each digital data stream contains a sequence of digital data values that may be asynchronous with respect to at least one of the other digital data streams. A clock source generates a common output clock signal having a common output sample rate.

The asynchronous dual-rate filters are coupled to the signal receivers and the clock source. Each asynchronous dual-rate filter receives a respective digital data stream at a respective input sample clock rate and generates a respective interpolated sequence of digital output samples, which are sampled at the common output sample rate. Thus, outputs of the asynchronous dual-rate filters are synchronous. Finally, the digital summer digitally sums the outputs of the asynchronous dual-rate filters so as to generate a sequence of summed digital signals at the common output sample rate.

BRIEF DESCRIPTION OF THE DRAWINGS

These and other aspects of the present invention will be more readily apparent from the following description and appended claims when taken in conjunction with the accompanying drawings, in which:

DESCRIPTION OF PREFERRED
EMBODIMENTS

Preferred embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
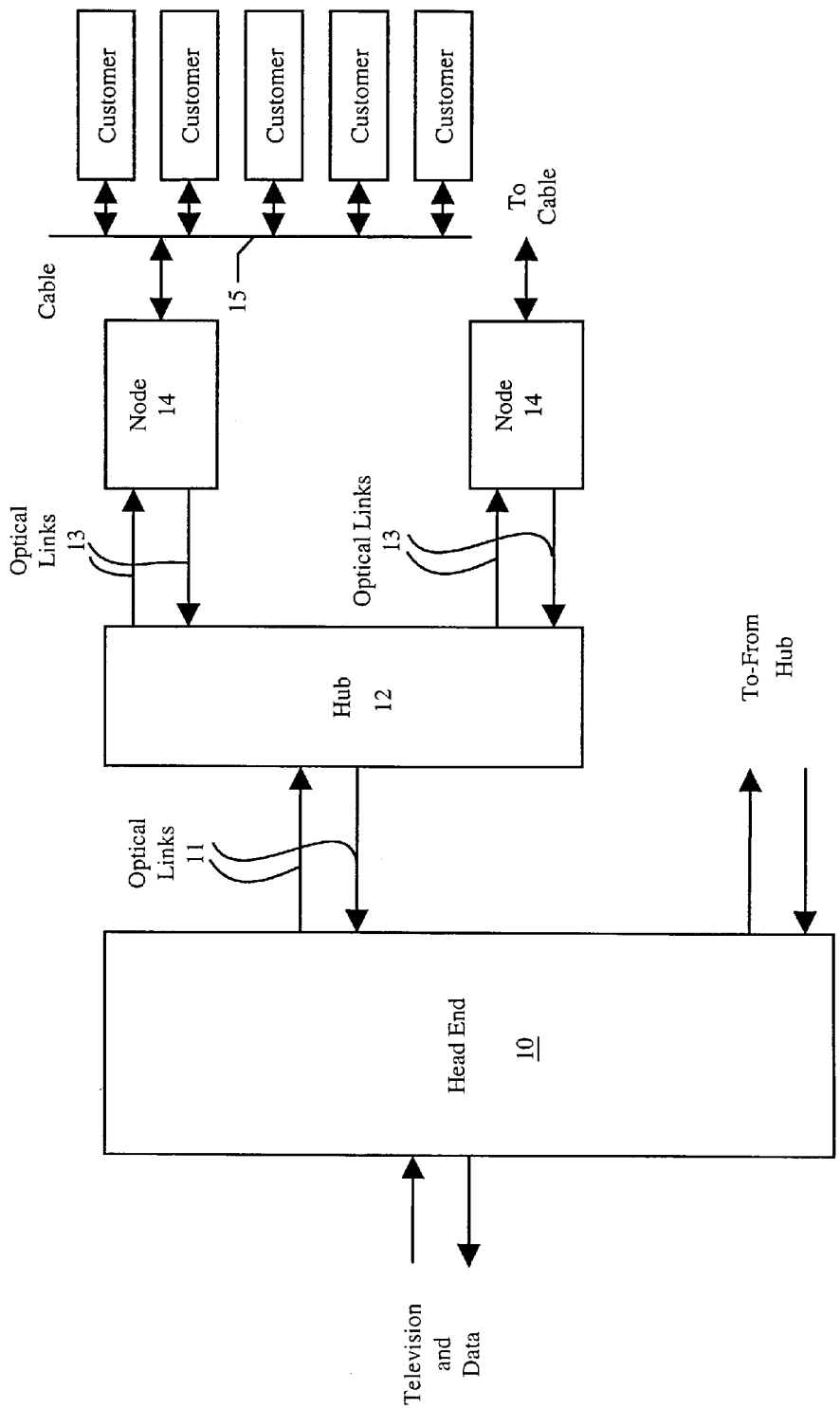
FIG. 1 shows the architecture of a cable television system.
Figure 2:
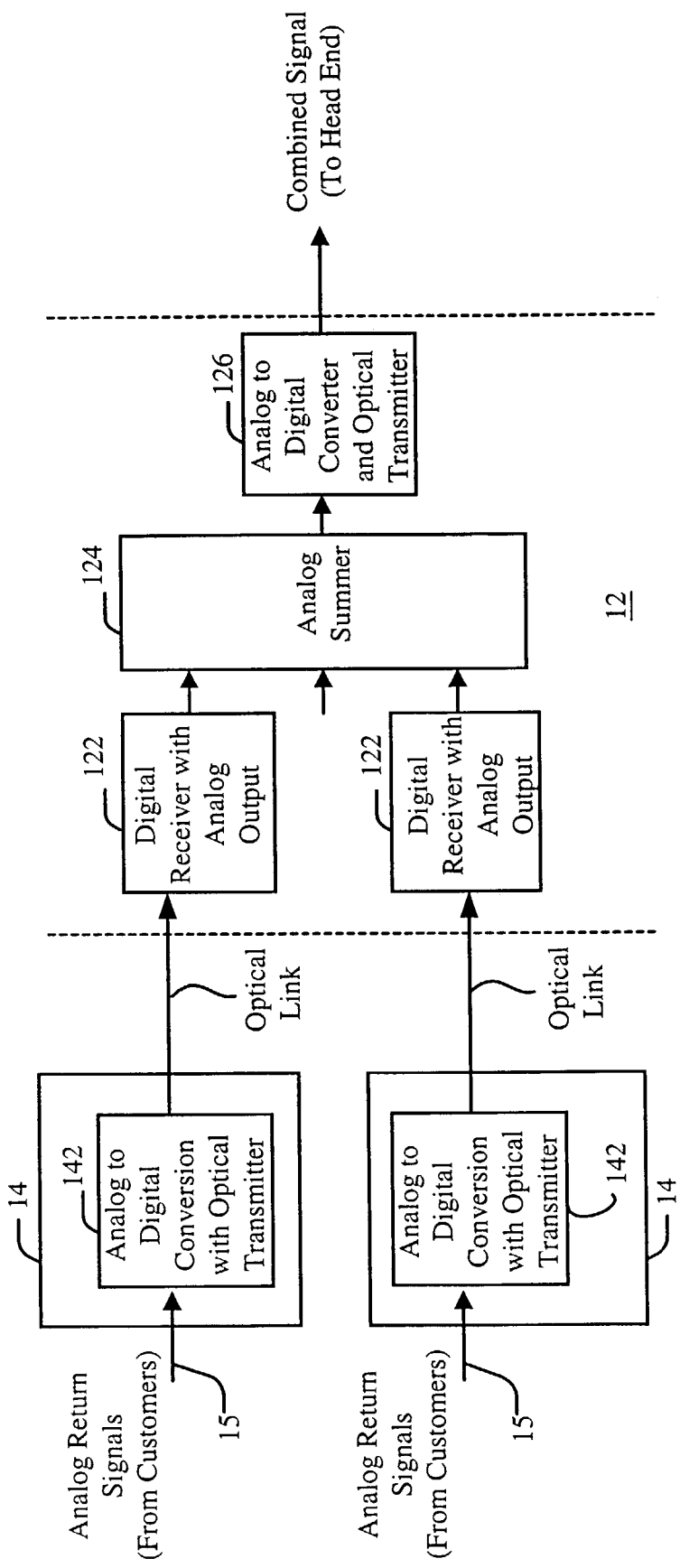
FIG. 2 is a block diagram of a cable television (CATV) digital return path of the prior art.
Figure 3:
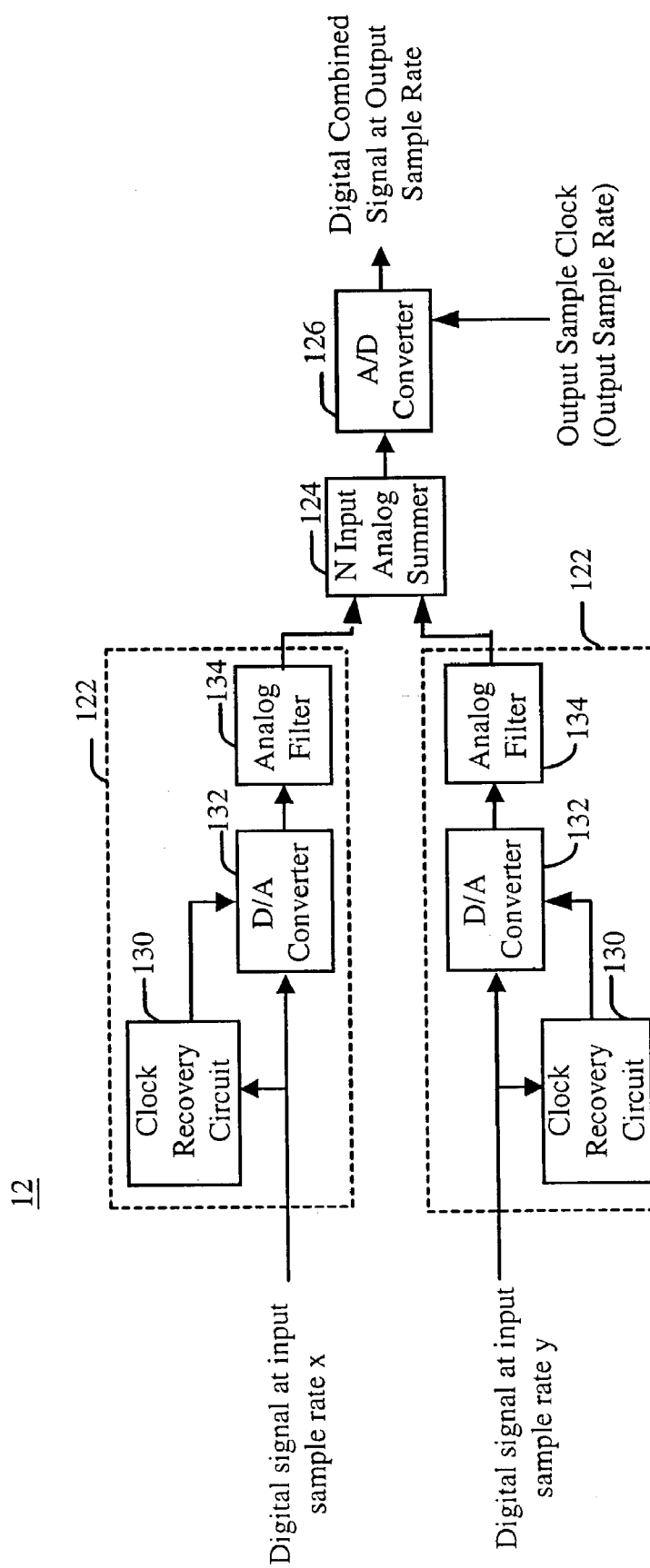
FIG. 3 is a block diagram of a hub of the prior art.
Figure 4:
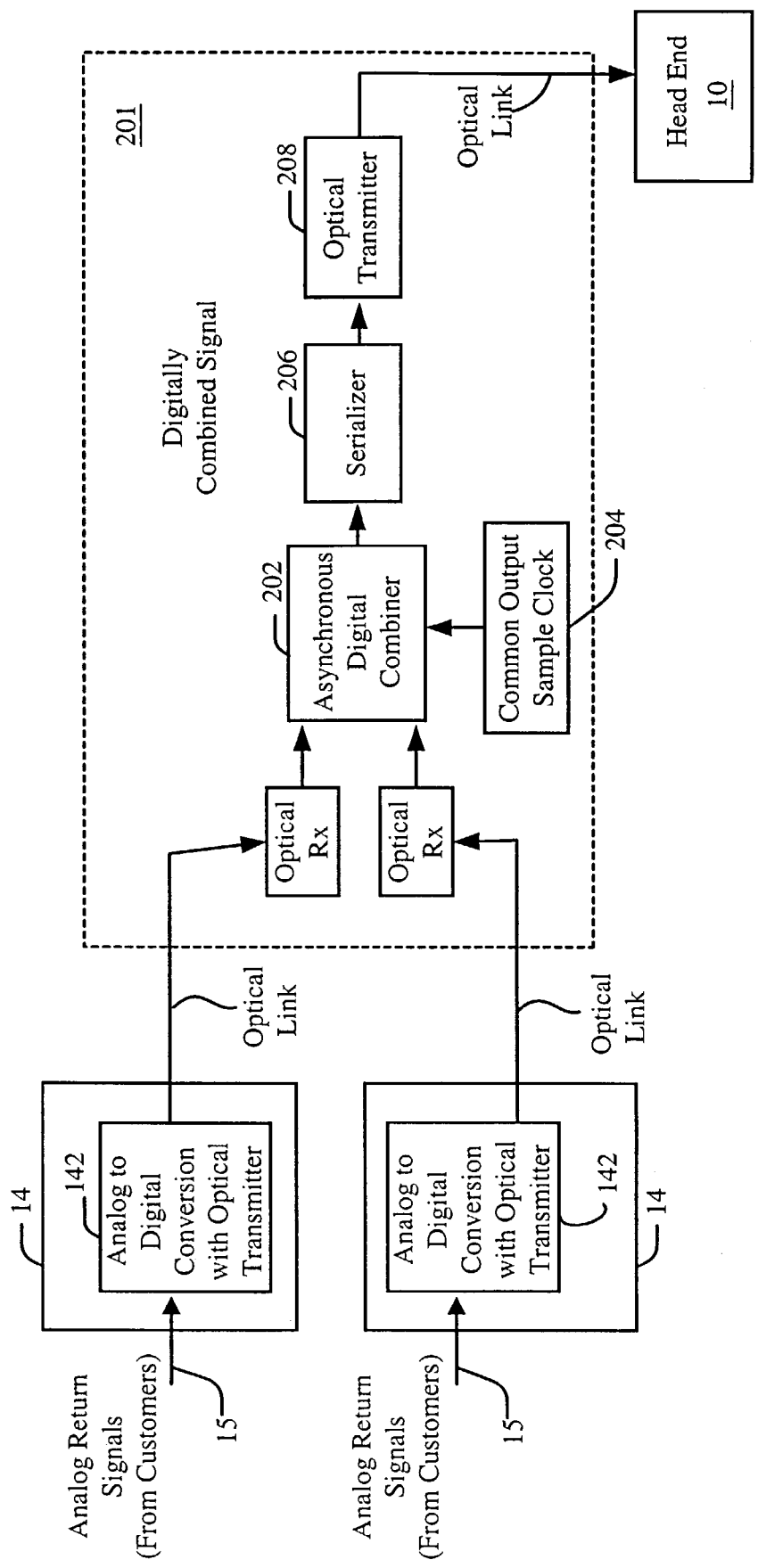
FIG. 4 is illustrates nodes coupled to a hub having an asynchronous digital return signal combiner according to an embodiment of the present invention.

FIG. 4 depicts a portion of a Hybrid Fiber Coaxial CATV Return Path System according to an embodiment of the present invention. Multiple analog return signals from the customers are received, for instance, via co-axial cables by nodes 14. At the nodes 14, these analog return signals are converted to digital return signal(s) and sent to the hub 201. The sample rate of the digital return signals is approximately 100 MHz in one embodiment (a wide range of other sample rates may be used in other embodiments), but the digital return signals are asynchronous with respect to each other. More generally, each of the digital return signals is asynchronous with respect to at least one of the other digital return signals. This asynchronicity is brought about because the sample rate and clock phase of each respective digital return signal is determined by a clock source in an individual node, whose frequency and phase will inevitably vary from the frequency and phase of the clock sources in the other nodes by at least a small amount.

As shown in FIG. 4, the hub 201 has fewer output fiber links to the head end than there are input fibers coming from the nodes. Thus, the hub 201 needs to combine the asynchronous digital return signals. But digitally summing the asynchronous digital return signals is problematic. For instance, if these asynchronous signals are summed regardless of their sample rates, it will be impossible to restore them accurately at the head end. A conventional solution is to convert the asynchronous digital return signals to analog signals, subsequently summing the analog signals and converting the summed analog signal back to digital signals for optical transmission.

Unlike prior art combiners, the digital return signal combiner 202 of the hub 201 of the present invention combines the asynchronous digital return signals without converting the asynchronous digital return signals to analog signals. The signal combiner 202 interpolates the asynchronous digital return signals to a common sample rate. The common sample rate is the frequency of an output sample clock signal generated by a clock generator 204. The interpolated digital return signals are synchronous and are summed digitally with a high degree accuracy by the digital signal combiner 202 to produce a sequence of combined digital signals at the rate of the output sample clock signal.

To avoid the resulting combined digital signal from being "clipped" when the amplitude of the summed signal exceeds the maximum value that can be represented within each of the received digital return signals, the digital signal combiner 202 may produce digital signals having a larger number of bits per sample than the samples in the digital return signals received from the nodes 14. For instance, if four digital return signals, each having 10-bits per sample, are combined by the combiner 202, the combiner 202 may be configured to generate 12-bit combined digital signals. Alternately, the combiner 202 may be configured to internally generate summed signals having more bits than the samples in the digital return signals received from the nodes, but to output only the N most significant bits per summed signal, where N is the number of bits per sample in the digital return signals. In yet other embodiments, other mechanisms may be used to prevent clipping of the combined digital signals generated by the combiner 202.

Digital Signal Combiner

Figure 5:
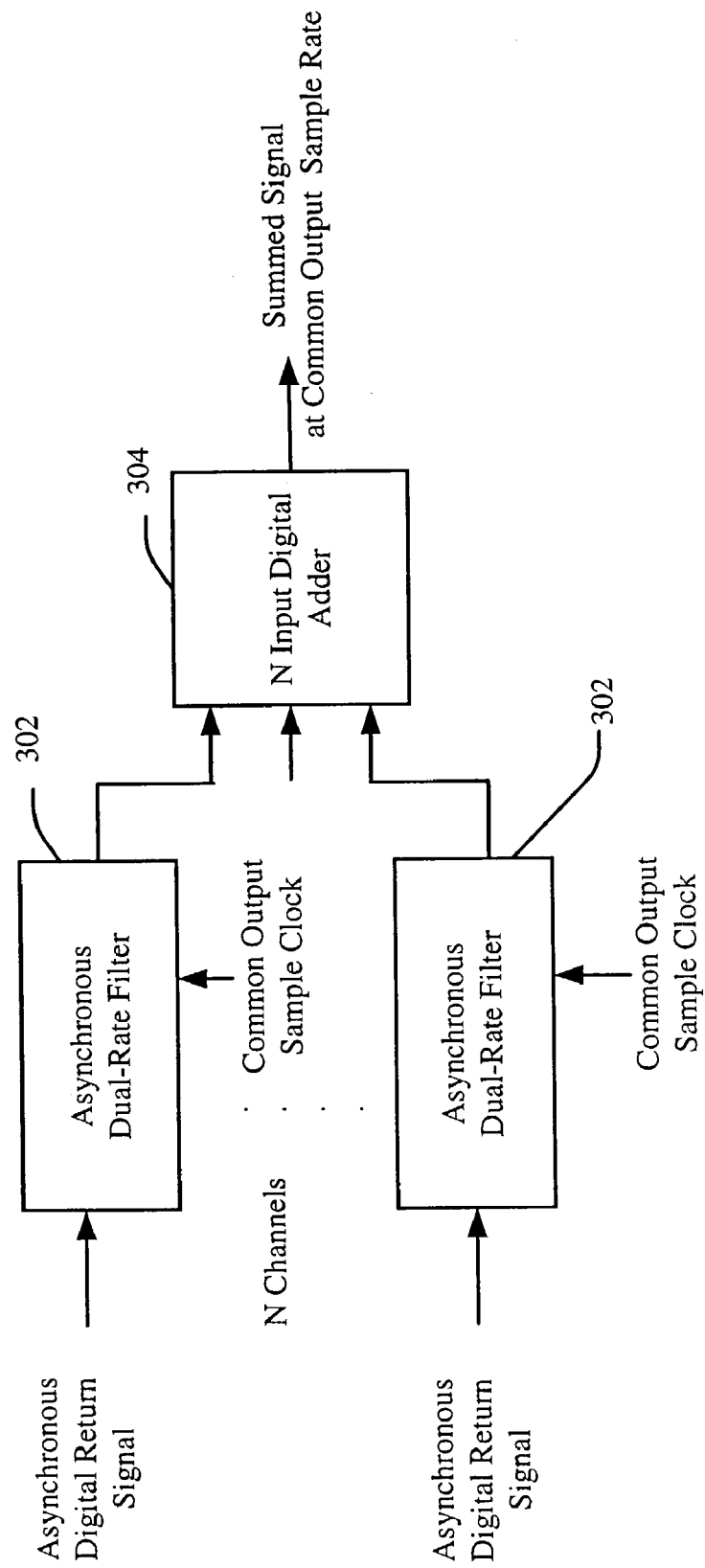
FIG. 5 is a block diagram of an asynchronous digital return signal combiner according to an embodiment of the present invention.

FIG. 5 is a block diagram of the digital return signal combiner 202 according to an embodiment of the present invention. Multiple digital return signals with different sample rates are received by the combiner 202. Each digital return signal is processed by a digital asynchronous dual rate filter 302. In particular, the asynchronous filter 302 converts the digital return signals at their respective input sample rates to re-clocked signals at a Common Output Sample Rate. These re-clocked signals, which are now synchronous, are then added by a synchronous digital adder 304 to form a summed digital signal. In other words, the output signal samples are the sum of the input samples adjusted to the Common Output Sample Rate. The summed digital signal is provided then to a serialization circuit 206 (FIG. 4), such as a SERDES circuit, and an optical transmitter 208 to be serialized and then transmitted to the head end 10. The summing of the asynchronous digital return signals is achieved without digital-to-analog or analog-to-digital conversions. Thus, disadvantages of the prior art analog combiners are avoided.

In one particular embodiment, the asynchronous dual-rate filter 302 is constructed based on a synchronous dual-rate filter design. Typical synchronous dual-rate filters are implemented using finite impulse response (FIR) digital filters. For a sample period of T and an FIR filter having G coefficients (i.e., G potentially non-zero coefficients), h, the output $x_s$ with input $y_s$ at sample time n*T is:

$$x_s(n*T) = \sum_{i=0}^{G-1} y_s((n-i)*T)h(i*T)$$

The impulse response of the FIR filter is required only at discrete times and the summation interval is limited to G coefficients.

An output of the FIR filter at a time between the sample points, at time $n*T+\delta$ with $\delta<T$ is:

$$x_s(n*T+\delta) = \sum_{i=0}^{G-1} y_s((n-i)*T)h(i*T+\delta)$$

Note that the filter coefficients h are functions of $\delta$. Particularly, when data is interpolated to M points within each T interval, M sets of coefficients are used. That is, each interpolation point within each T interval requires its own set of filter coefficients. Thus, the synchronous dual-rate filter 302 needs M sets of interpolation coefficients. At each output time, G multiply-and-accumulate operations are performed using the set of coefficients corresponding to that interpolation point. Thus, the synchronous dual-rate filter 302 needs G coefficients for each set. With M coefficient sets and G coefficients within each set, the filter needs to store a total of M*G coefficients in its memory.

Synchronous Dual-Rate Filter

Figure 6:
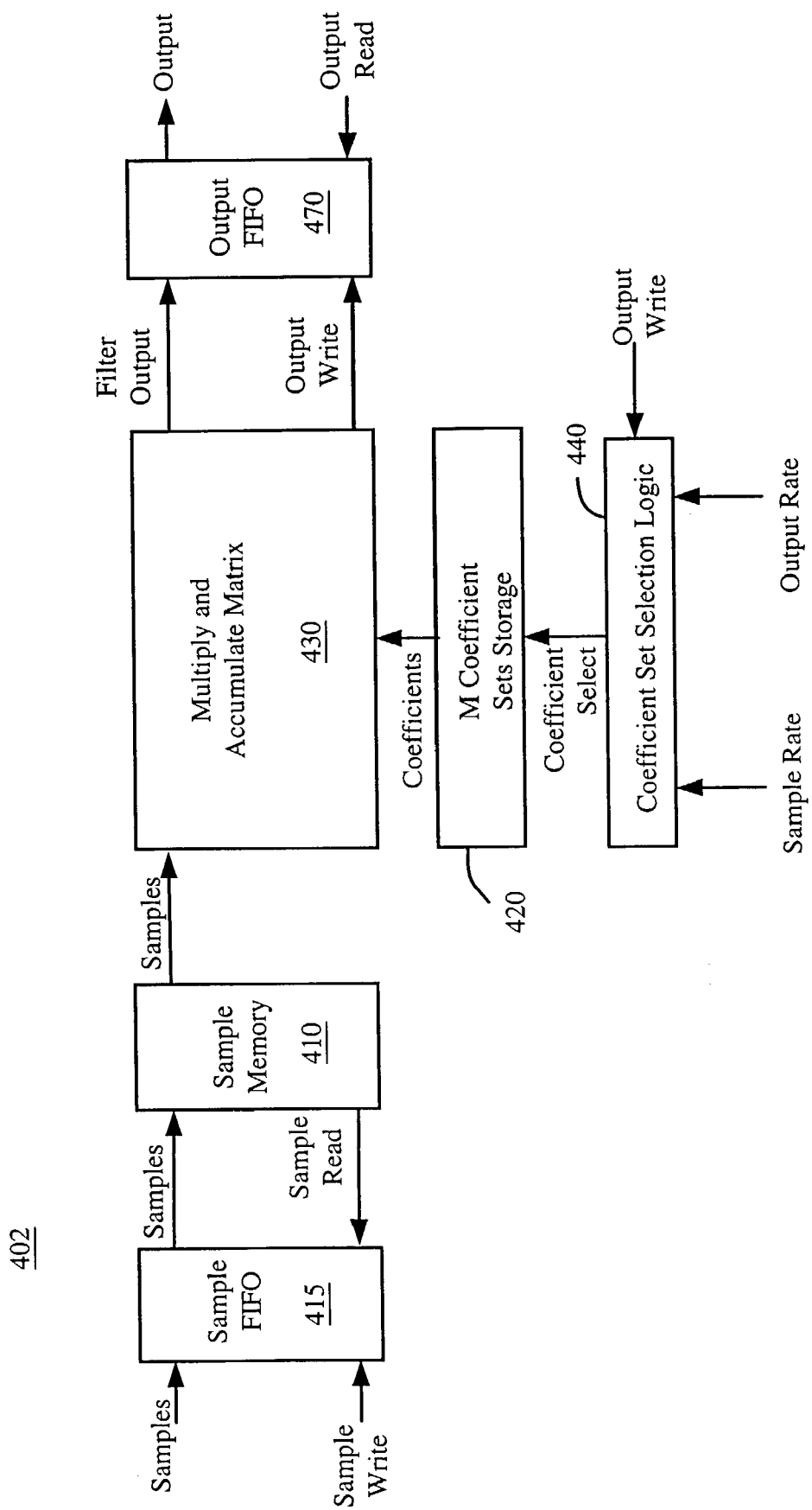
FIG. 6 is a block diagram of a synchronous dual-rate filter.

A synchronous dual-rate filter 402 is shown in FIG. 6. The input samples are received and temporarily stored in a Sample FIFO (first in first out) buffer 415. From the Sample FIFO 415, input samples are loaded into a sample memory 410 used to compute a next output sample. The sample memory 410 is typically a shift register that presents G of its internally stored values to an FIR filter, implemented in a preferred embodiment with a multiply and accumulate matrix 430.

M sets of interpolation coefficients, described above, are stored in a coefficient storage array 420. The coefficient set associated with an output time at the desired time is selected and used to compute the output. The number of coefficient sets in the synchronous dual-rate filter is selected to provide the desired accuracy of the output signal. "Synchronous" implies that the input and output rate are a ratio of integers N/M. The number of coefficient sets is M. Consecutive output samples are computed using an increase in the coefficient set index of N mod M.

Selection of the coefficient set to be used to compute a next output sample is accomplished by coefficient set selection logic 440. The coefficient set selection logic generates a new coefficient index, for selecting a coefficient set, each time that a new output sample is generated and written to an Output FIFO buffer 470. As indicated above, each coefficient set has G coefficients. The currently selected set of G coefficients are received by the multiply and accumulate matrix 430, which multiplies G successive input samples by the selected set of G coefficients and then sums the results to produce a new output sample, which is written into the output buffer 470.

$$OutputSample = \sum_{i=0}^{G-1} (InputSample((n-i)*T)) \times Coefficient_{SelectedSet}(i)$$

In a synchronous dual rate filter, the computation of a next coefficient index is accomplished by adding a fixed number, $\Delta$Index, to the index. The fixed number, $\Delta$Index, is a function of the ratio, f, of the output sample time to the input sample time, and the number of coefficients in the coefficient storage 420. The fixed number, which can include a fractional portion, is added to a master index value, Index, and then the Coefficient Selection is set to an integer corresponding to the index value. Preferably the Coefficient Selection is set to either (A) the integer portion of the Index, or (B) the integer closest in value to Index.

$$f = \frac{\text{output cycle duration}}{\text{sample cycle duration}} = \frac{\text{sample rate}}{\text{output rate}} = \frac{N}{M}$$

$\Delta$Index=$f \times M$=$N$

Index=(Index+$\Delta$Index)Modulo $M$

Coefficient Select=Closest Integer(Index)

For instance, if the duration of an output sample is 10.1 nanoseconds and the duration of an input sample is 10.0 nanoseconds, then f=1.01 (e.g., a ratio of 101 to 100), and if M=100, then $\Delta$Index=101. In effect, the Index is increased by 1 (i.e., $\Delta$Index modulo M) for each successive output sample, and the Coefficient Selection is a corresponding integer index value. This makes intuitive sense because the output clock cycle (sample duration) is longer than the input clock cycle, which indicates that the index should keep advancing so as to produce an interpolation at increasing phase relative to the phase of the input samples.

If the output sample duration is similar to but smaller than the input sample duration (i.e., the output clock is running faster than the input clock), then the Coefficient Selection value will continuously decrease at a rate of M-$\Delta$Index. If the output sample duration and input sample duration are significantly different, the Coefficient Selection value will advance in larger steps than if the output sample duration and input sample duration differ by only a small amount.

If the output of the filter 402 is not required at each sample time, the output can be computed only when needed. This process is referred to as decimation. For synchronous decimation, the filter output is computed at a sub-multiple, 1/L for example, of the Common Output Sample Rate, where L is an integer. That is, outputs are computed every L samples. Each output requires G multiply-and-accumulate operations, but outputs can be at the 1/L rate.

Both the interpolation and the decimation processes are combined preferably into a single process to allow an output rate of M/L times the sample frequency. The filter 402 is designed with M coefficient sets. Each time an output sample is computed, L*ΔIndex is added to the Index, modulo M, and then the corresponding integer value is used as the Coefficient Selection. Furthermore, if M is selected to correspond to the least common multiple of two integers that define the ratio, f, of the output sample duration to the input sample duration, then ΔIndex will be an integer, further simplifying the coefficient set selection logic, by eliminating the need to keep track of the fractional portion of the coefficient Index.

It is noted here that the Sample FIFO 415 and Output FIFO 470 are optional in a synchronous dual-rate filter, as input data could potentially be written directly into the sample memory 410 and output samples could potentially be read directly from the multiple and accumulate matrix 430. However, depending on the ratio of output to input sample durations, directly writing input samples and directly reading output samples may not be compatible with the time required for the multiple and accumulate matrix 430 to compute each output sample, especially if the data rate of the samples is high (e.g., 1 billion samples per second). Therefore use of at least a Sample FIFO 415 is preferred.

Asynchronous Dual-Rate Filter

Figure 7:
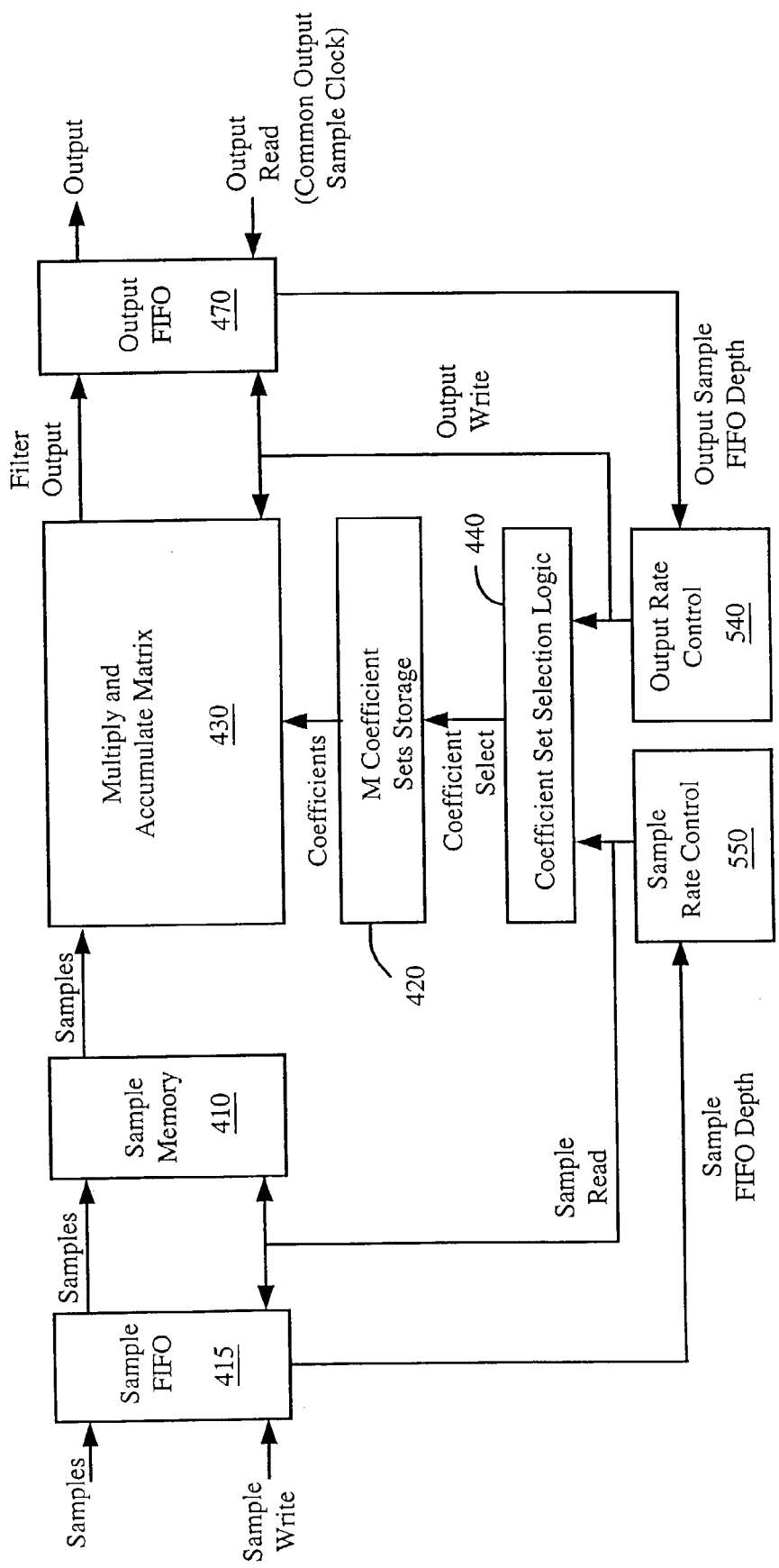
FIG. 7 is a block diagram an asynchronous dual-rate filter according to one embodiment of the present invention.

The asynchronous dual-rate filter used in the present invention, shown in FIG. 7, is an extension of the synchronous dual-rate filter of FIG. 6. In a synchronous dual rate filter, the ratio of output sample duration to input sample duration, f, is a ratio of integers and is constant (i.e., it does not change with time). Because of these properties, the coefficient selection logic of a synchronous filter can be optimized for a particular ratio of output and input sample rates (also called clock rates) and there is no need to monitor for changes in the output and/or input sample rates. In an asynchronous dual rate filter, the ratio of output sample duration to input sample duration, f, may not be a ratio of integers and may change with time. In this embodiment, the dual-rate asynchronous filter 302 is the same as the dual-rate synchronous filter 402 of FIG. 6, except for some additional logic used to dynamically generate the ratio of output sample duration to input sample duration, f, based on the fullness levels of the Sample FIFO 415 and Output FIFO 470.

With reference to FIG. 7, input samples are placed into the Sample FIFO 415 at the sample rate. The long term rate of removal of samples for the Sample FIFO 415 is equal to the input sample rate, but has short term variations. The dual-rate filter 302 computes output samples at the output rate with short term variations with time. The output samples are placed in the Output FIFO 470 and removed at the output sample rate. The asynchronous dual-rate filter 302 maintains computational values for the input and output sample intervals. The values are different, by small amounts, from the actual sample and output intervals. As a result the number of samples in the FIFO's 415, 470 changes from a nominal half full value. The Sample FIFO Depth value and the Output Sample FIFO Depth value are used by the Sample Rate Control logic 550 and the Output Rate Control logic 540 to adjust the computational values of rates used in the filter 302.

More specifically, the Sample Rate Control Logic 550 and includes a Numerically Controlled Oscillator (NCO), which is used to generate the Sample Read clock signal. The NCO is configured to have a center frequency equal to the nominal, expected frequency of the input samples (e.g., 100 MHz). The NCO responds to a clock adjusting signal by varying its frequency. If the rate of the Sample Read clock signal is faster than the rate at which samples are being received, then the Sample FIFO 415 will become less than half full, at first intermittently and then consistently. When a clock speed adjusting circuit within the Logic 550 determines that the Sample FIFO 415 is less than half full (or more generally, less than a threshold level of fullness), the clock adjusting signal decreases the NCO frequency by a small amount. Similarly, when the clock speed adjusting circuit within the Logic 550 determines that the Sample FIFO 415 is more than half full (or more generally, more than a threshold level of fullness), the clock adjusting signal increases the frequency of the NCO by a small amount. The rate of the Sample Read clock signal generated by the NCO is adjusted until it is roughly in balance with the rate at which samples are received from a transmitting device.

The Output Rate Control logic 540 also contains a NCO in this case responsive to the fullness level of the Output FIFO 470. The Output Rate Control logic 540 generates the Output Write clock signal. Note that the Output Read clock signal is not controlled by the Output Rate Control logic 540. In a preferred embodiment, a common clock signal (Common Output Sample Rate) is used among multiple asynchronous dual-rate filters 302 as the Output Read clock such that the output samples are synchronous and such that the output samples can be summed by the digital summer 304.

In addition to generating the Sample Read and Output Write clock signals, the clock speed adjusting circuits within the Logic 550 and Logic 540 each generate a digital value suitable for adjusting the ratio value f used by the Coefficient Set Selection Logic 440. In a preferred embodiment, the digital values generated by Logic 550 and Logic 540 are configured so that when these two values are added, the resulting value is the ΔIndex value (i.e., f*M) required for updating the coefficient index.

Figure 9:
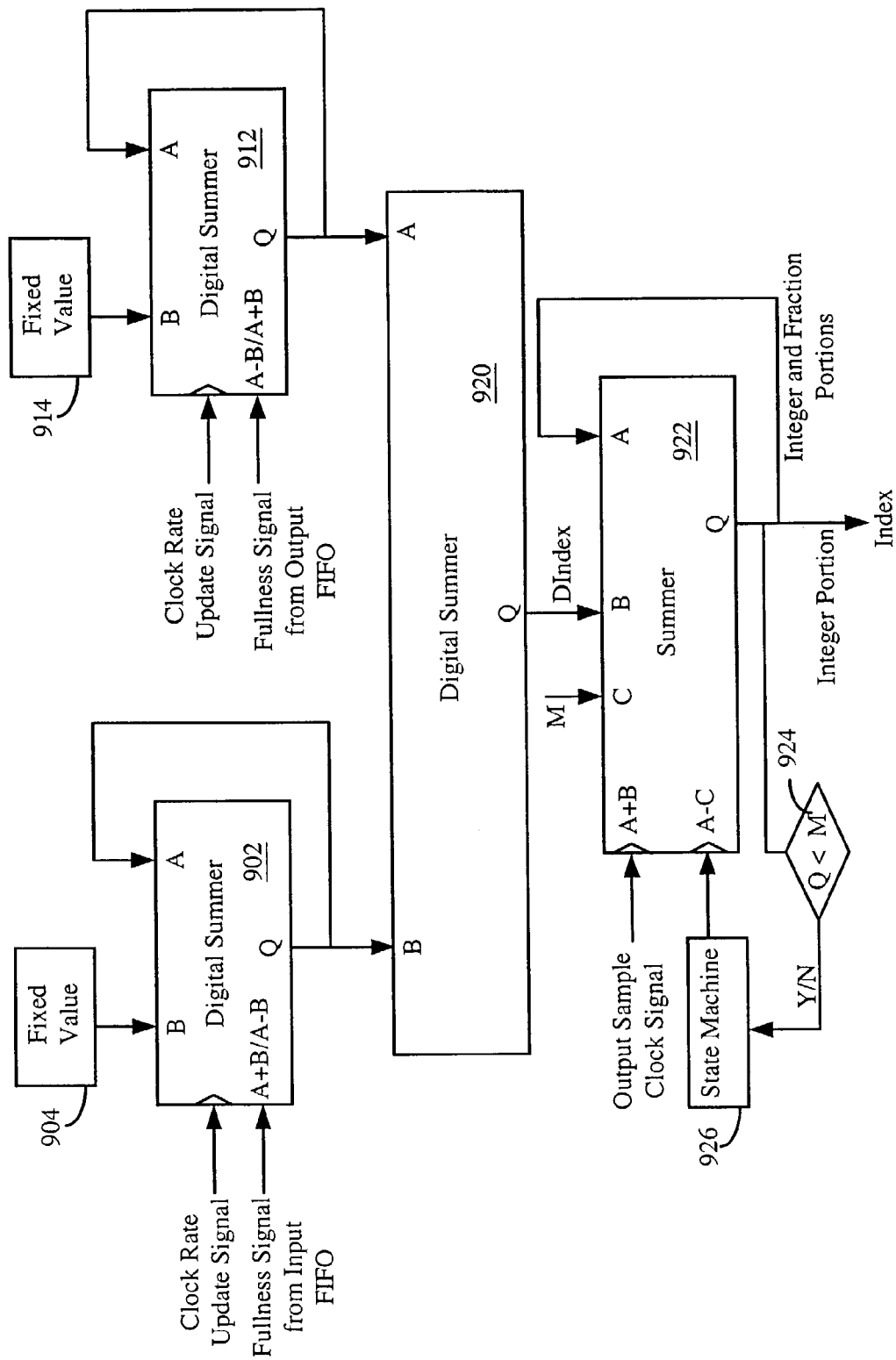
FIG. 9 is a block diagram of circuitry for generating a coefficient index and a coefficient index addend, $\Delta$index, in one embodiment of the present invention.

One implementation of the circuitry for generating ΔIndex and for generating coefficient index values is shown in FIG. 9. It should be noted that this is an exemplary implementation, and that many modifications to this circuit as well other equivalent circuits could be used in other embodiments. A first digital summer 902, which may be located in either the Input Sample Rate Control Logic 550 or in the Coefficient Set Selection Logic 440, is updated at the same time that input clock rate is updated. In particular, if the input clock sample duration is being decreased because the input FIFO is too fill, then a fixed value 904 is added to the previous value output by the first digital summer 902. On the other hand, if the input clock sample duration is being increased because the input FIFO is too empty, then the fixed value 904 is subtracted from the previous value output by the first digital summer 902.

A second digital summer 912, which may be located in either the Output Sample Rate Control Logic 540 or in the Coefficient Set Selection Logic 440, is updated at the same time that output clock rate is updated. In particular, if the output clock sample duration is being decreased because the output FIFO is too empty, then a fixed value 914 is subtracted from the previous value output by the second digital summer 912. On the other hand, if the output clock sample duration is being increased because the output FIFO is too full, then the fixed value 914 is added to the previous value output by the second digital summer 912. Preferably, the input and output clocks are updated at regular, periodic intervals, such as once every N output clock cycles, where N is an integer such as 16, 32, 64 or 128.

A third digital summer 920 sums the outputs of the first and second digital summers 902, 912 to generate the ΔIndex value. A fourth digital summer 922 sums the current index value with ΔIndex to generate a next index value each time that a new output sample is to be computed. Additional logic 924, 926 is used to operate this fourth digital summer 922 as a "modulo M" summer. In particular, a comparator 924 determines if the index value output by summer 922 exceeds a predefined threshold value, such as M, and a state machine 926 signals the summer 922 to subtract M from the index when the index exceeds the predefined threshold value.

The fixed values 904, 914 are configured so that adding or subtracting this value corresponds to the amount that the input or output clock rate is being adjusted by the corresponding rate control logic 550 or 540. In addition, the first and second digital summers 902, 912 are initialized with values that, when digitally summed, are equal to M (i.e., the number of coefficient sets in the coefficient sets memory). As a result, if the input and output rates are identical, the coefficient index will remain at a fixed value. If the input and output rates vary over time or if they are not identical, the ΔIndex value generated by the digital summers 902, 912, 920 will automatically be adjusted at the same time that the input or output sample clocks are adjusted.

While the Sample Read clock signal may never exactly match the rate at which samples are received, and while the Output Write clock signal may never exactly match the rate at which output samples are removed from the Sample FIFO and Output FIFO, respectively, the clock speed adjusting circuits of Logic 550 and Logic 540 permit the system to dynamically achieve full frequency tracking and locking between the sending and receiving ends of the asynchronous dual rate filter. In addition, while the index addend, ΔIndex, may never reach a stable value, the running average value of ΔIndex will correspond to the running average of the ratio of the output sample duration to the input sample duration.

Operation of the Asynchronous Dual-Rate Filter

The following is a description of the operation of the asynchronous dual-rate filter 302 in a preferred embodiment. To understand the description provided below, it is important to first understand the terminology used and the definitions of the quantities being computed. The asynchronous dual-rate filter 302 keeps track of "time" from the perspective of the input sample clock domain. In particular, each clock period of the input sample clock domain has a duration of "M" units, where M is the number of coefficient sets. Thus, when time advances by 1 unit, the time has actually advanced by 1/M cycles of the input sample clock. In addition, both the index value (for selecting a coefficient set) and the time are computed "modulo M". Thus, when the index value exceeds M, the value M is subtracted from the index. Similarly, when the computed index is negative, M is added to the value so as to produce a value between 0 and M. In one implementation, the Time value is compared with (1−f)M and is decreased by M if Time is not less than (1−f)M. As a result, the value of Time is bounded by the range −fM to (1−f)M. In that implementation, comparator 924 (FIG. 9) compares the computed index, Q, with (1−f)M (which is equal to M−ΔIndex).

Figure 8:
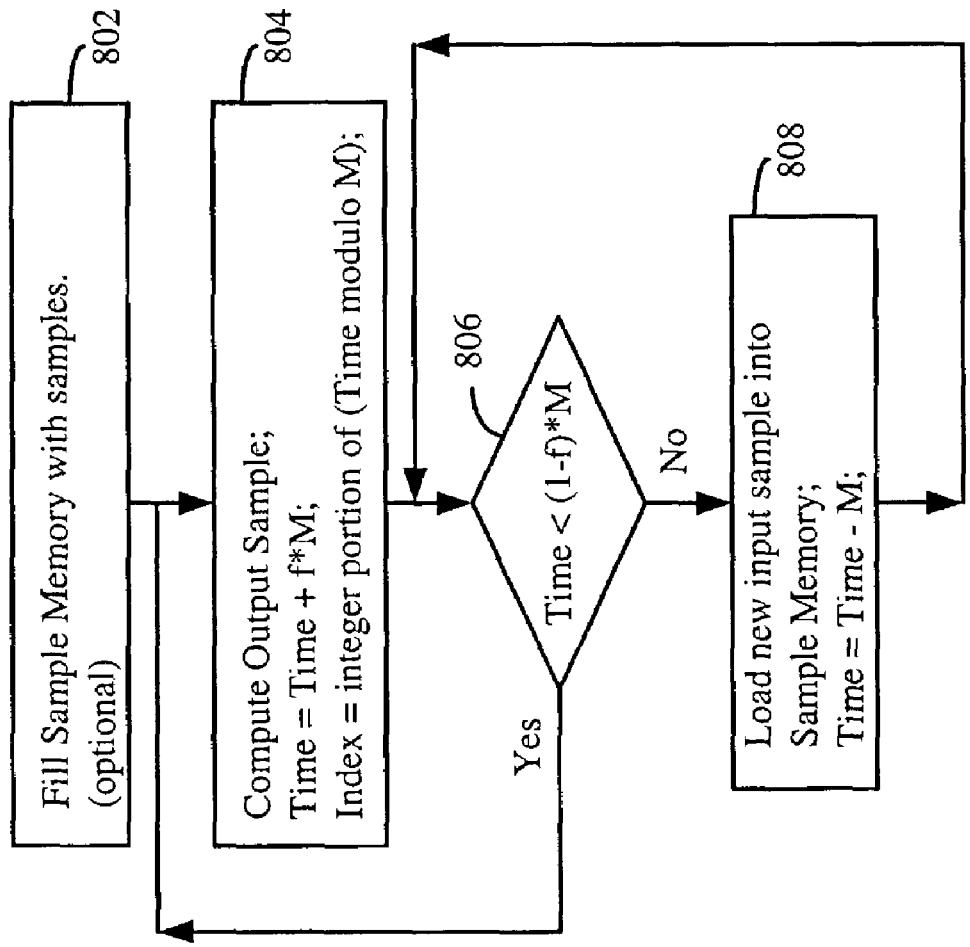
FIG. 8 is a flow chart of a control method of the asynchronous dual-rate filter of FIG. 7.

Referring to FIG. 8, in one embodiment, the operation of the asynchronous dual-rate filter 302 preferably includes the following steps. Prior to the main operation loop, the sample memory is filled with input samples (step 802). Alternately, the filter can be operated for G output sample cycles, where G is the number of coefficients in each coefficient set, so as to "prime" the filter for operation. The first G output samples generated in this manner should be discarded, since they may be based in part on zero or random sample values stored in the Sample Memory 410 (FIG. 7) of the asynchronous dual-rate filter 302.

In a first step of the main operation loop, a new output sample is computed (step 804). In addition, the Time value is increased by f*M and the coefficient Index is set equal to the integer portion of "Time module M". To control the rate at which new output samples are generated by the filter, step 804 is synchronized with the output clock of the filter. For instance, whenever the control loop reached step 804, execution of step 804 may be delayed until the beginning of the next output clock cycle. Alternately, the filter may synchronize with the output clock by executing step 804 and then waiting at the end of step 804 until the beginning of the next output clock cycle.

Next, at step 806, the filter checks to see if Time is less than (1−f)M. If so (806-Yes), step 804 is executed again, without loading a new sample into the Sample Memory. If not (806-No), a new sample is loaded into the Sample Memory and Time is decreased by M (808). Then, the test in step 806 is repeated. Execution of Step 808 may be synchronized with the input sample clock, in addition to or instead of synchronizing the execution of step 804 with the output sample clock.

The control method shown in FIG. 8 is equally applicable to the synchronous dual-rate filter of FIG. 6 and the asynchronous dual-rate filter of FIG. 7. The primary differences between the two control methods are that the ratio of output to input sample periods, f, is dynamically updated in the asynchronous dual-rate filter, and that the rates of the input and output sample clocks may vary (usually only very slightly) over time. While the operation of the asynchronous dual-rate filter has been described primarily from the viewpoint of a system in which the input sample and output sample rates are similar but not identical, the asynchronous dual-rate filter of FIG. 7 and the control method of FIG. 8 are also suitable for use when the input sample and output sample rates differ substantially from each other.

Referring back to FIGS. 4 and 5, each of the parallel input data channels arriving at the hub node has an asynchronous dual-rate filter 302 that converts the received data stream into a data stream having an output sample rate that is the same as the output sample rate for all the input data channels. The outputs of the multiple filters 302 are synchronous and are added together by the synchronous digital adder 304, forming the outputs that are converted by the optical transmitter 208 into an optical data signal to be transported over the digital optical link to the head end 10.

To meet the Nyquist criteria, the multiple digital return signals preferably represent analog signals band-limited to frequencies of less than ½ the common sample rate.

Preferred embodiments of the invention and best modes for carrying out the invention have thus been disclosed. While the present invention has been described with reference to a few specific embodiments, the description is illustrative of the invention and is not to be construed as limiting the invention. Various modifications may occur to those skilled in the art without departing from the true spirit and scope of the invention. It should also be noted that some embodiments of the present invention described above can be implemented by hardware logic (e.g., Field Programmable Gate Array(s)). In addition, a person skilled in the art would realize upon reading the present disclosure that portions of the present invention can be implemented as computer executable programs executable by a digital signal processor. Further, although the embodiments described above use finite impulse response (FIR) digital filters for rate conversion, a person skilled in the art would realize upon reading the present disclosure that other embodiments of the invention can use infinite impulse response digital filters and variable time update periods.

What is claimed is:

1. An asynchronous return path signal combiner, comprising:
   a plurality of signal receivers for receiving a plurality of digital data streams, each digital data stream comprising a sequence of digital data values received asynchronously at a rate and phase that is asynchronous with respect to at least one of the other digital data streams;
   a plurality of asynchronous dual-rate filters, coupled to the plurality of signal receivers, each asynchronous dual-rate filter receiving a respective digital data stream of the plurality of digital data streams at a respective input sample clock rate and generating a respective interpolated sequence of digital output samples; and
   a digital summer coupled to the plurality of asynchronous dual-rate filters, the digital summer summing the respective interpolated sequences of digital output samples from the plurality of asynchronous dual-rate filters so as to generate a sequence of summed digital signals at a common output sample rate;
   wherein at least one of the asynchronous dual-rate filters includes:
      an input FIFO buffer storing digital data values according to an input write clock and outputting stored digital values to a respective one of the asynchronous dual-rate filters according to a respective input sample clock rate;
      logic for generating a first fullness signal representing fullness of the input FIFO buffer;
      an output FIFO buffer storing interpolated digital values according to an output write clock and outputting the stored interpolated digital values at the common output sample rate;
      logic for generating a second fullness signal representing fullness of the output FIFO buffer;
      logic for adjusting the input read clock according to the first fullness signal; and
   logic for adjusting the output write clock according to the second fullness signal
      a coefficient sets memory for storing a plurality of distinct sets of interpolation coefficients, each said set of interpolation coefficients for generating an output digital signal with a respective distinct phase relative to the sequence of digital data values in a respective digital data stream of the plurality of digital data streams;
      an FIR filter for generating each digital output sample of the respective interpolated sequence of digital output samples, each digital output sample being generated in accordance with a coefficient index identifying a set of interpolation coefficients from among the plurality of sets of interpolation coefficients in the coefficient sets memory; and
      coefficient selection logic for generating a sequence of coefficient indices, for identifying a sequence of coefficient sets to be used by the FIR filter to generate a corresponding sequence of digital output samples.

2. The asynchronous return path signal combiner of claim 1, wherein the coefficient selection logic comprises:
   logic for generating an index addend in accordance with the first and second fullness signals, and logic for generating each index in the sequence of coefficient indices by summing a previous index and the index addend.

3. The asynchronous return path signal combiner of claim 1, further comprising a clock source for controlling the common output data rate.

4. A method for digitally combining asynchronous data streams, comprising:
   receiving a plurality of digital data streams, each digital data stream comprising a sequence of digital data values received asynchronously at a rate that is asynchronous with respect to at least one of the other digital data streams;
   filtering the plurality of digital data streams to generate a like plurality of interpolated sequences of digital output values with a like plurality of FIR filters;
   generating a like plurality of synchronous interpolated sequences of digital output values from the interpolated sequences of digital output values; and
   digitally summing the plurality of synchronous interpolated sequences of digital output values to generate a sequence of summed digital signals at a common output sample rate;
   buffering the plurality of digital data streams with input FIFO buffers; and monitoring fullness of the input FIFO buffers;
   buffering the plurality of interpolated sequences of digital output values with output FIFO buffers;
   monitoring fullness of the output FIFO buffers;
   adjusting a rate at which digital data values of each of the plurality of digital data streams are provided to the asynchronous dual-rate filters according to the fullness of the input FIFO buffers;
   adjusting a rate at which digital output values of each of the plurality of interpolated sequences are read from the asynchronous dual-rate filters according to the fullness of the output FIFO buffers;
   storing a plurality of distinct sets of interpolation coefficients, each said set of interpolation coefficients for generating an output digital signal with a respective distinct phase relative to the sequence of digital data values in a respective digital data stream of the plurality of digital data streams;
   generating each digital output sample of the respective interpolated sequence of digital output samples, each digital output sample being generated in accordance with a coefficient index identifying a set of interpolation coefficients from among the plurality of distinct sets of interpolation coefficients in the coefficient sets memory;
   generating a sequence of coefficient indices; and
   identifying a sequence of coefficient sets to be used by one of the FIR filters to generate a corresponding sequence of digital output samples.

5. The method of claim 4, wherein the step of generating comprises:
   generating an index addend in accordance with the first and second fullness signals, and
   generating each index in the sequence of coefficient indices by summing a previous index and the index addend.

6. An asynchronous dual-rate filter, comprising:
   a FIR filter for receiving a stream of digital values and for generating an interpolated sequence of digital values;

an output FIFO for retrieving the interpolated sequence of digital values from the FIR filter at an output write sample rate and for outputting the interpolated sequence of digital values at an output read sample rate;

logic for monitoring a fullness level of the output FIFO;

logic for adjusting the output write sample rate according to the fullness level of the output FIFO;

logic for adjusting the FIR filter, coupled to the output FIFO and including logic for computing coefficients for the FIR filter according to at least in part the fullness level of the output FIFO;

an input FIFO for providing the stream of digital values to the FIR filter, the input FIFO storing digital values at an input write sample rate and outputting the digital values at an input read sample rate;

logic for monitoring a fullness level of the input FIFO; and logic for adjusting the input read sample rate according to the fullness level of the input FIFO, wherein the logic for computing comprises logic for computing the coefficients according to at least in part the fullness level of the input FIFO and the fullness level of the output FIFO.

7. The asynchronous dual-rate filter of claim 6, wherein the logic for computing comprises:
  an M coefficient sets storage for storing M sets of coefficients; and
  a coefficient selection logic for receiving the sample read clock and an output write clock and selecting a set of coefficients from the M coefficient sets storage in accordance with the sample read clock and output write clock.

8. The asynchronous dual-rate filter of claim 7, wherein data is interpolated to M points within a time interval, and wherein each interpolation point is associated with a respective one of the M coefficient sets.

9. The asynchronous dual-rate filter of claim 7, wherein the FIR filter comprises:
  a multiply and accumulate matrix that receives the selected set of coefficients from the coefficient selection logic; and
  a sample memory coupled to the multiply and accumulate matrix for presenting stored digital values thereto in parallel.

10. The asynchronous dual-rate filter of claim 9, wherein the selected set of coefficients, consists of G interpolated coefficients, the multiply and accumulate matrix including:
  a multiplier that multiplies G successive input samples by the G interpolated coefficients; and
  a summer that sums the results of the multiplier to produce a new output sample.

11. The asynchronous dual-rate filter of claim 10, wherein the new output sample is decimated by 1/L, where L is a positive, non-zero integer.

12. The asynchronous dual-rate filter of claim 11, wherein interpolation and decimation result in an output rate of M/L times sample frequency.

13. The asynchronous dual-rate filter of claim 12, wherein when an output sample is computed, L times $\Delta$index is added to the index, modulo M.

14. The asynchronous dual-rate filter of claim 7, wherein the coefficient selection logic comprises a new coefficient index generator that computes, each time a new output sample is generated, an index for selecting a set of the M coefficient sets.

15. The asynchronous dual-rate filter of claim 14, wherein the index is generated at least by adding to a master index value a number, L/index, that is a function of a ratio of output sample time to input sample time and M, such that when the output sample time is smaller than the input sample time, the index is decreased at a rate of M minus $\Delta$index.

16. An asynchronous return path signal combiner, comprising:
  a plurality of signal receivers for receiving a plurality of digital data streams, each digital data stream comprising a sequence of digital data values received asynchronously at a rate and phase that is' asynchronous with respect to at least one of the other digital data streams;
  a clock source for generating a common output clock signal having a common output sample rate;
  a plurality of asynchronous dual-rate filters, coupled to the plurality of signal receivers and the clock source, each asynchronous dual-rate filter receiving a respective digital data stream of the plurality of digital data streams at a respective input sample clock rate and generating a respective interpolated sequence of digital output samples at the common output sample rate; and
  a digital combiner coupled to the plurality of asynchronous dual-rate filters, the combiner summing the respective interpolated sequences of digital output samples from the plurality of asynchronous dual-rate filters so as to generate a sequence of summed digital signals at the common output sample rate;
  wherein at least one of the asynchronous dual-rate filters includes:
    an input FIFO buffer, including logic for generating a first fullness signal representing fullness of the input FIFO buffer;
    an output FIFO buffer, including logic for generating a second fullness signal representing fullness of the output FIFO buffer;
    a coefficient sets memory for storing M distinct sets of interpolation coefficients, each said set of interpolation coefficients for generating an output digital signal with a respective distinct phase relative to the sequence of digital data values in a respective digital data stream of the plurality of digital data streams;
    a FIR filter for generating each digital output sample of the respective interpolated sequence of digital output samples, each digital output sample being generated in accordance with a coefficient index identifying a set of interpolation coefficients from among the M sets of interpolation coefficients in the coefficient sets memory; and
    coefficient selection logic for generating a sequence of coefficient indices, for identifying a sequence of coefficient sets to be used by the FIR filter to generate a corresponding sequence of digital output samples, including logic for generating an index addend, $\Delta$Index, in accordance with the first and second fullness signals, and for generating each index in the sequence of coefficient indices by summing previous index and the index addend.

* * * * *